(No Model.)
T. W. HAMMOND & M. D. QUAID.
REIN HOLDER.
No. 319,244. Patented June 2, 1885.
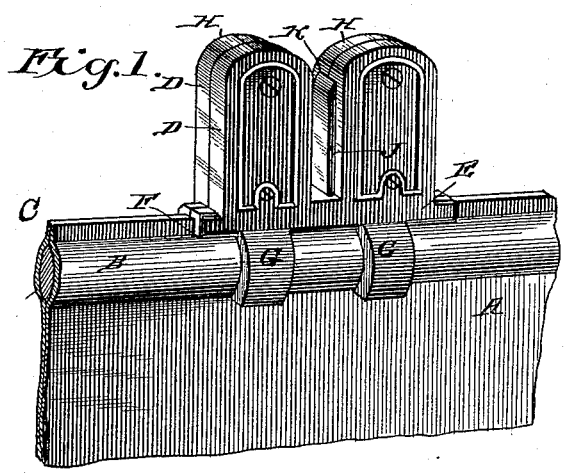
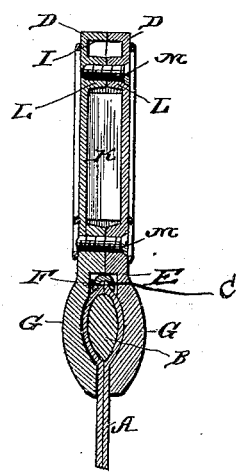
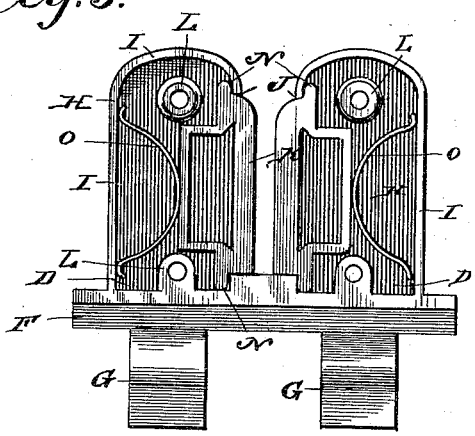
WITNESSES:
Fred. G. Dieterich
Wm Lecher
Thomas W. Hammond
Martin D. Quaid
INVENTOR.
By Louis Bagger & Co
ATTORNEYS.

United States Patent Office.

THOMAS W. HAMMOND AND MARTIN D. QUAID, OF DENVER, COLORADO.

REIN-HOLDER.

SPECIFICATION forming part of Letters Patent No. 319,244, dated June 2, 1885.

Application filed April 6, 1885. (No model.)

*To all whom it may concern:*

Be it known that we, THOMAS W. HAMMOND and MARTIN D. QUAID, both residents of Denver, in the county of Arapahoe and State of Colorado, have invented certain new and useful Improvements in Rein-Holders; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of our improved rein-holder, showing it attached to a portion of the dash of a vehicle. Fig. 2 is a transverse section of the same, and Fig. 3 is a side view of the rein-holder with one side removed.

Similar letters of reference indicate corresponding parts in all the figures.

Our invention has relation to that class of rein-holders which are adapted to be clamped upon the dash of a vehicle; and it consists in the improved construction and combination of parts of the same, as hereinafter more fully described and claimed.

In the accompanying drawings, the letter A indicates a portion of the dash of a vehicle. B is the roll or enlargement in the same formed by the frame of the dash, and C is the thinner edge.

The rein-holder consists of two plates or castings, D D, consisting each of a base portion, E, which is recessed longitudinally at F for the reception of the edge of the dash, two curved or bulged lips, G G, which clamp the roll or enlargement B, and two upwardly-projecting lips or casings, H H, having flanges I around their edges, with the exception of the inner edges, which are open to form slots J, through which the clamping or rein-holding blocks K K project. The inner sides of the casings have perforated registering-lugs L, through which pass screws M, which secure the casings together with their open sides facing, the flanges and lugs registering, and which serve to draw the two halves of the entire device together, so as to cause their base portions and lips to clamp the dash. The bolts K or rein-holding blocks are preferably cut away or recessed at their inner portions to reduce their weight without reducing their strength, and are formed at their upper and lower ends with projecting lips N, which bear against the upper and lower ends of the slots in the facing edges of the casings, preventing the bolts from being forced out through the slots, curved springs O O bearing with their bulged portions against the inner sides of the bolts and forcing them out, the diverging ends of the springs bearing against and sliding upon the inner sides of the outer flanges of the casings. It will thus be seen that the reins may be forced edgewise down between the two casings and the bolts, the said bolts and their springs yielding sufficiently to allow the reins to be slipped down and holding them, when down, by their tension, which, however, is not sufficiently strong to prevent the reins from being withdrawn in the same manner, while the edges of the bolts will prevent the reins from being drawn out lengthwise.

We are aware that it is not broadly new to have a bifurcated casting with spring-actuated jaws at their inner or facing edges, and we do not claim such; but

We claim and desire to secure by Letters Patent—

1. In a rein-holder of the described class, the combination of the jaw-containing hollow box or casting, a pair of jaws or bolts inserted into said hollow box, one on each side, and confined in their respective recesses so as to slide in a vertical plane only, and a pair of springs adapted to force the jaws or bolts toward each other in a vertical plane, substantially as and for the purpose shown and specified.

2. In a rein-holder, the combination of two casings, secured upon the dash and having longitudinal slots in their inner or facing edges, two bolts projecting with their facing sides or edges through the said slots, and having free play in a vertical plane within said casings, and having straight inner edges or sides, and two curved springs bearing with their curved portion against the middle of the inner sides or edges of the said bolts, substantially as and for the purpose set forth.

In testimony that we claim the foregoing as our own we have hereunto affixed our signatures in presence of two witnesses.

THOMAS W. HAMMOND.
MARTIN D. QUAID.

Witnesses:
JOHN M. ANDREWS,
JULIUS BROWN.